United States Patent
Li et al.

(10) Patent No.: US 12,186,905 B2
(45) Date of Patent: Jan. 7, 2025

(54) SLIP SIMULATION APPARATUS, CONTROLLED ROBOT, AND GAME HANDLE

(71) Applicant: TENCENT TECHNOLOGY (SHENZHEN) COMPANY LIMITED, Shenzhen (CN)

(72) Inventors: Xiong Li, Shenzhen (CN); Yu Zheng, Shenzhen (CN); Ruoxuan Jiang, Shenzhen (CN); Xinyang Jiang, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 348 days.

(21) Appl. No.: 17/715,428

(22) Filed: Apr. 7, 2022

(65) Prior Publication Data
US 2022/0226988 A1    Jul. 21, 2022

Related U.S. Application Data

(63) Continuation of application No. PCT/CN2021/080831, filed on Mar. 15, 2021.

(30) Foreign Application Priority Data

Apr. 23, 2020 (CN) .......................... 202010327089.8

(51) Int. Cl.
*B25J 9/00* (2006.01)
*A63F 13/218* (2014.01)
(Continued)

(52) U.S. Cl.
CPC ........... *B25J 9/1612* (2013.01); *A63F 13/218* (2014.09); *A63F 13/24* (2014.09); *B25J 13/025* (2013.01);
(Continued)

(58) Field of Classification Search
CPC ........ A63F 13/285; A63F 13/24; A63F 13/28; A63F 2300/1047; A63F 2300/1043;
(Continued)

(56) References Cited

U.S. PATENT DOCUMENTS 8,610,548 B1 * 12/2013 Provancher ............. G06F 3/016
340/407.1
9,905,090 B2    2/2018 Ullrich et al.
(Continued)

FOREIGN PATENT DOCUMENTS

CN    102125495 A    7/2011
CN    103853363 A    6/2014
(Continued)

OTHER PUBLICATIONS

"The Slip Pad: A Haptic Display Using Interleaved Belts to Simulate Lateral and Rotational Slip," by Colin Ho. et al., 2015 IEEE World Haptics Conference (WHC), pp. 189-195, published Aug. 6, 2015. (Year: 2015).*
(Continued)

*Primary Examiner* — Steven J Hylinski
(74) *Attorney, Agent, or Firm* — ANOVA LAW GROUP PLLC

(57) ABSTRACT

Embodiments of the present disclosure provide a slip simulation apparatus, a controlled robot, a game handle, a virtual game console, and a control system. The slip simulation apparatus includes a base; at least one motor arranged on the base; a slip simulation controller, configured to: receive slip data, and generate a rotating speed control signal used for controlling the at least one motor; and at least one synchronous wheel, at least one synchronous belt, and at least one limit apparatus associated with the motor, the synchronous wheel being sleeved on the synchronous belt and the limit apparatus, the motor being drivingly connected to the at least (Continued)

one synchronous wheel to drive, according to the rotating speed control signal, the at least one synchronous wheel and the at least one synchronous belt to rotate.

19 Claims, 13 Drawing Sheets

(51) Int. Cl.
  *A63F 13/24* (2014.01)
  *B25J 9/16* (2006.01)
  *B25J 13/02* (2006.01)
  *B25J 13/08* (2006.01)
(52) U.S. Cl.
  CPC ..... *B25J 13/084* (2013.01); *A63F 2300/1043* (2013.01); *A63F 2300/1056* (2013.01); *A63F 2300/8082* (2013.01)
(58) Field of Classification Search
  CPC .............. A63F 2300/8082; G06F 3/016; B25J 9/1612; B25J 13/02; B25J 13/025; B25J 13/083; B25J 13/084
  See application file for complete search history.

(56) References Cited

U.S. PATENT DOCUMENTS

| | | | |
|---|---|---|---|
| 10,279,251 | B2 | 5/2019 | Grant |
| 10,488,934 | B2* | 11/2019 | Provancher .............. G06F 3/016 |
| 11,868,533 | B2* | 1/2024 | Zheng ..................... G06F 3/016 |
| 2004/0174200 | A1 | 9/2004 | McNutt |
| 2005/0148432 | A1* | 7/2005 | Carmein ............ A63B 22/0235 482/8 |
| 2008/0004114 | A1* | 1/2008 | McVicar ............... A63F 13/285 463/37 |
| 2019/0073038 | A1 | 3/2019 | Provancher et al. |

FOREIGN PATENT DOCUMENTS

| | | |
|---|---|---|
| CN | 104035556 A | 9/2014 |
| CN | 104043246 A | 9/2014 |
| CN | 110974167 A | 4/2020 |
| CN | 111437595 A | 7/2020 |
| JP | 2000262757 A | 9/2000 |
| WO | WO-2019178522 A1 * | 9/2019 ............. G06F 3/014 |

OTHER PUBLICATIONS

"A Novel Monitoring System for Haptic Belt Control To Augment Human-Machine Interaction," by Vijay Humar Pediredla et al., iFAC-PapersOnLine, vol. 53, Issue 1, 2020, pp. 585-590. (Year: 2020).*

The World Intellectual Property Organization (WIPO) International Search Report for PCT/CN2021/080831 Jun. 15, 2021 8 Pages (including translation).

The Japan Patent Office (JPO) Notification of Reasons for Refusal for Application No. 2022-539709 and Translation Jun. 26, 2023 10 Pages.

The European Patent Office (EPO) The Extended European Search Report for 21793220.1 Apr. 11, 2023 13 Pages (including translation).

Ho Colin et al: "The Slip-Pad: A haptic display using interleaved belts to simulate lateral and rotational slip",2015 IEEE World Haptics Conference (WHC), IEEE,Jun. 22, 2015 (Jun. 22, 2015), pp. 189-195,XP033188576, DOI: 10.1109/WHC.2015.7177712.

Dana D Damian et al: "Wearable haptic device for cutaneous force and slip speed display",Robotics and Automation (ICRA),2012 IEEE International Conference on, IEEE, May 14, 2015 (May 14, 2012), pp. 1038-1043,XP032450731,DOI: 10.1109/ICRA.2012.6225000.

Robert J Webster III et al: "A novel two-dimensional tactile slip display:design, kinematics and perceptual experiments",ACM Transactions on Applied Perception,Association for Computing Machinery, Inc,New York, NY, US,vol. 2,No. 2,Apr. 1, 2005 (Apr. 1, 2005), pp. 150-160,XP058168929,ISSN: 1544-3558, DOI: 10.1145/1060581.1060588.

Tsagarakis N G et al: "Slip Aestheasis:A Portable 2D Slip/Skin Stretch Display for the Fingertip",Haptic Interfaces for Virtual Environment and Teleoperator Systems,20 05.WHC 2005.First Joint Eurohaptics Conference and Symposium on Pisa, Italy Mar. 18-20, 2005, Piscataway, NJ, USA, IEEE, Mar. 18, 2005 (Mar. 18, 2005), pp. 214-219,XP010781816,DOI: 10.1109/WHC.2005.117, ISBN: 978-0-7695-2310-1.

* cited by examiner

SLIP SIMULATION APPARATUS, CONTROLLED ROBOT, AND GAME HANDLE

RELATED APPLICATION(S)

This application is a continuation application of PCT Patent Application No. PCT/CN2021/080831 filed on Mar. 15, 2021, which claims priority to Chinese Patent Application No. 202010327089.8, filed with the China National Intellectual Property Administration on Apr. 23, 2020, all of which are incorporated herein by reference in entirety.

FIELD OF THE TECHNOLOGY

The present disclosure relates to the field of remote operation control, and in particular, to a slip simulation apparatus, a controlled robot, a game handle, a virtual game console, and a control system.

BACKGROUND

When a user operates a controlled end such as a robot or a game character, the controlled end such as the robot or the game character generates a touch sense in a movement process. To enable the user to perceive the touch sense of the controlled end, the touch sense may be simulated.

Tactile simulation solutions in certain existing technologies use a pressure sense (pressure for short), and there are a few apparatuses using a slip sense (slip for short). A slip simulation apparatus in certain existing technologies may be complex in structure and difficult to process, provide a limited range of movement, and provide slide simulation in a single direction, resulting in poor user experience.

SUMMARY

Embodiments of the present disclosure provide a slip simulation apparatus and a control system, which can simulate a slip in a remote operation, enabling a user to synchronously perceive continuous slides in a plurality of directions and at a plurality of speeds.

In one aspect, the present disclosure provides a slip simulation apparatus, including: a base; at least one motor arranged on the base; a slip simulation controller, configured to: receive slip data, and generate a rotating speed control signal used for controlling the at least one motor; and at least one synchronous wheel, at least one limit apparatus, and at least one synchronous belt associated with the motor, the synchronous belt being sleeved on the synchronous wheel and the limit apparatus, the motor being drivingly connected to the at least one synchronous wheel to drive, according to the rotating speed control signal, the at least one synchronous wheel and the at least one synchronous belt to rotate.

In another aspect, the present disclosure provides a controlled robot, including: a controlled end communicator, configured to: receive pressure control data, and transmit slip data to the slip simulation apparatus provided in the embodiments of the present disclosure; a controlled end pressure sensor, configured to: detect a pressure applied by the controlled robot, and generate pressure data of the controlled robot; and a controlled end controller, communicably connected to the controlled end communicator and the controlled end pressure sensor, the controlled end controller being configured to: adjust, according to the pressure data of the controlled robot and the pressure control data, the pressure applied by the controlled robot; and convert the pressure data of the controlled robot into the slip data, and transmit the slip data to the controlled end communicator.

In yet another aspect, the present disclosure provides a game handle, including: a housing; a power supply; and the slip simulation apparatus provided in the embodiments of the present disclosure arranged inside the housing, the slip simulation apparatus being configured to: receive slip data from a virtual game console, and output pressure control data to the virtual game console, to control a virtual object in a virtual game application, the virtual game application being run in the virtual game console.

In yet another aspect, the present disclosure provides a virtual game console, including: a controlled end communicator, configured to: receive pressure control data from the game handle provided in the embodiments of the present disclosure, and transmit slip data to the game handle; a processor, configured to run a virtual game application, a first virtual object in the virtual game application being controlled by the game handle, the processor being further configured to: compute pressure data, the pressure data indicating pressure applied by the first virtual object on a second virtual object; adjust, according to the pressure data and the pressure control data, the pressure applied by the first virtual object on the second virtual object, and update the pressure data; and convert the updated pressure data into the slip data, and transmit the slip data to the controlled end communicator; and a screen, configured to display that the first virtual object adjusts the pressure applied by the first virtual object to the second virtual object.

In yet another aspect, the present disclosure provides a control system, including the slip simulation apparatus provided in the embodiments of the present disclosure and the controlled robot provided in the embodiments of the present disclosure.

In yet another aspect, the present disclosure provides a control system, including the game handle provided in the embodiments of the present disclosure and the virtual game console provided in the embodiments of the present disclosure.

In the slip simulation apparatus and the control system provided in the embodiments of the present disclosure, the slip simulation apparatus implements a continuous slip simulation without a displacement range constraint by using infinite rotation of a synchronous belt structure. The structure is simple, manufacturing is convenient, the cost is low, and a user can perceive a sliding speed and direction of a controlled end device in real time. The control system senses a pressure from the user through a pressure sensor, to transmit a control signal to the controlled end in real time to change the sliding speed of the controlled end.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In the following description, many details are provided to facilitate a full understanding of the present disclosure. The described implementations are only some implementations rather than all the implementations of the present disclosure. Other implementations obtained by a person of ordinary skill in the art based on the implementations of the present disclosure without creative efforts shall fall within the protection scope of the present disclosure.

In addition, the following description of various embodiments is provided to exemplify the specific embodiments of the present disclosure with reference to accompanying drawings. The directional terms such as "longitudinal", "transverse", and "vertical" refer to the directions in the accompanying drawings. Therefore, the used directional terms are used for better and clearer description and understanding of the present disclosure, rather than indicating or implying that the apparatus or element may have a particular orientation or may be constructed and operated in a particular orientation. Therefore, such terms shall not be construed as limiting of the present disclosure. Unless otherwise explicitly specified or defined, the terms such as "install", "connect", and "connection" shall be understood in a broad sense. For example, the connection may be a fixed connection, a detachable connection, or an integral connection; or the connection may be a mechanical connection; or the connection may be a direct connection, an indirect connection through an intermediary, or internal communication between two components. A person of ordinary skill in the art may understand the specific meanings of the terms in the present disclosure according to specific situations.

Figure 1:
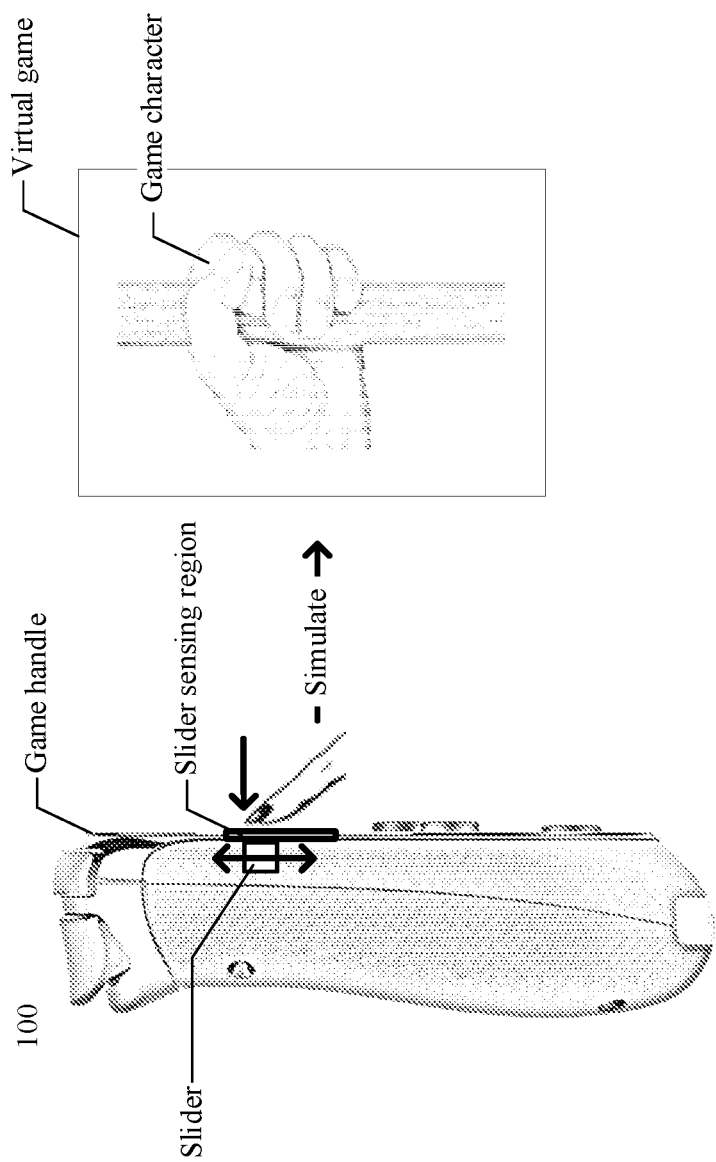
FIG. 1 is a schematic structural diagram of an apparatus for generating a shearing force according to embodiment(s) of the present disclosure.

FIG. 1 is a schematic structural diagram of an apparatus 100 for generating a shearing force according to an embodiment of the present disclosure.

Generally, a magnitude of a slip may be represented by a magnitude of a shearing force. The shearing force represents a friction force generated when a relative movement occurs between adjacent layers. An apparatus for generating a shearing force is shown in FIG. 1. The apparatus generates a shearing force in a slider sensing region by making a slider slide behind a contact member. A user touches the slider sensing region to perceive the shearing force generated from the sliding of the slider. For the apparatus 100 for generating a shearing force shown in FIG. 1, the apparatus 100 may be used as one of the components of a game handle. The component may provide a slip feedback to the user. For example, it is assumed that a game character in a virtual game tries to hold a stick as shown in FIG. 1, and the stick may slide downward because the stick is too heavy or the surface of the stick is too smooth. In certain embodiment(s), when a finger of the user is in contact with the slider sensing region, a downward sliding force of the stick may be perceived by making the slider slide downward. After the user perceives that the stick slides down through the game handle, the user may increase a grip force on the game handle to control the game character.

The apparatus 100 can simulate the perception of a relative movement between a virtual object and another virtual object in the virtual game as well as a speed and shock of the relative movement for a user. However, a movement displacement of the slider only has a size of the slider sensing region, so that the apparatus 100 cannot provide a continuous slip to the user. Moreover, because the slider can only move vertically in a single direction, the user cannot perceive the shearing force generated by the slider in different directions on a same plane through the apparatus 100. However, in an actual production process, the apparatus 100 has a complex structure and is difficult to process, resulting in an increased cost of game production.

Based on the above, the embodiments of the present disclosure a slip simulation apparatus, a controlled robot, a game handle, a virtual game console, and a control system. The slip simulation apparatus uses a synchronous belt to simulate a slip. Because the synchronous belt can rotate infinitely without a displacement range constraint, the slip simulation apparatus can provide a continuous slip simulation. In the embodiments of the present disclosure, a plurality of intersecting synchronous belts are further used to implement sliding synthesis in a plurality of directions, thereby implementing slide simulation in different directions and at different speeds. The slip simulation apparatus provided in the embodiments of the present disclosure is simple in structure, easy to manufacture, and low in cost, and allows a user to perceive a sliding speed and direction of a controlled object in real time.

The following describes the slip simulation apparatus and the control system provided in the embodiments of the present disclosure in detail with reference to the accompanying drawings.

Figure 2A:
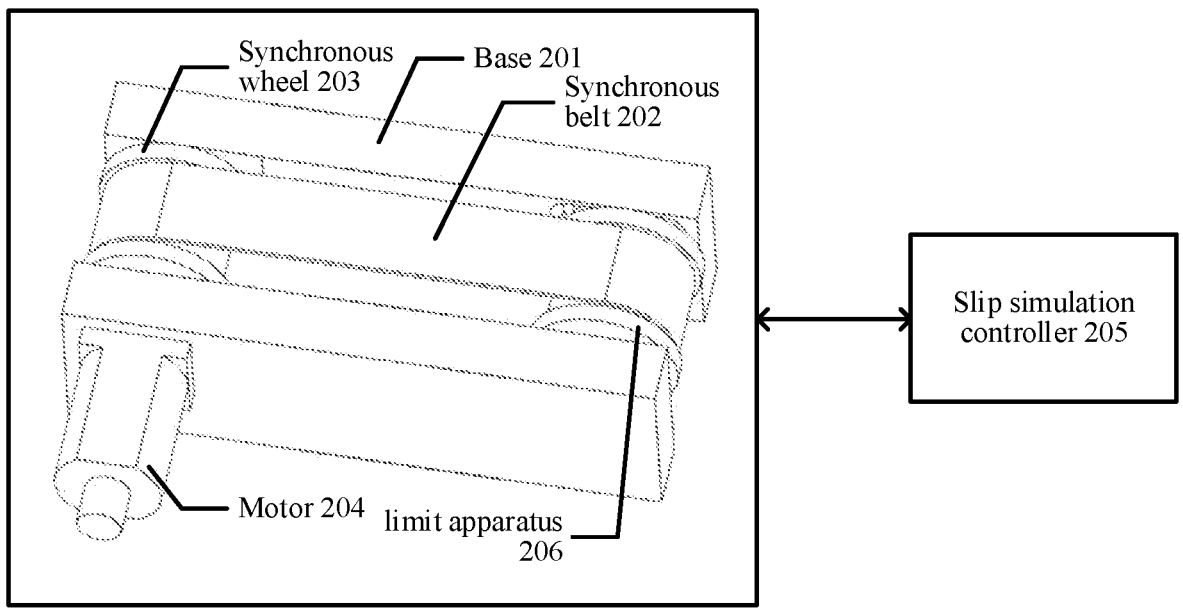
FIG. 2A is a schematic structural diagram of a slip simulation apparatus according to embodiment(s) of the present disclosure.
Figure 2B:
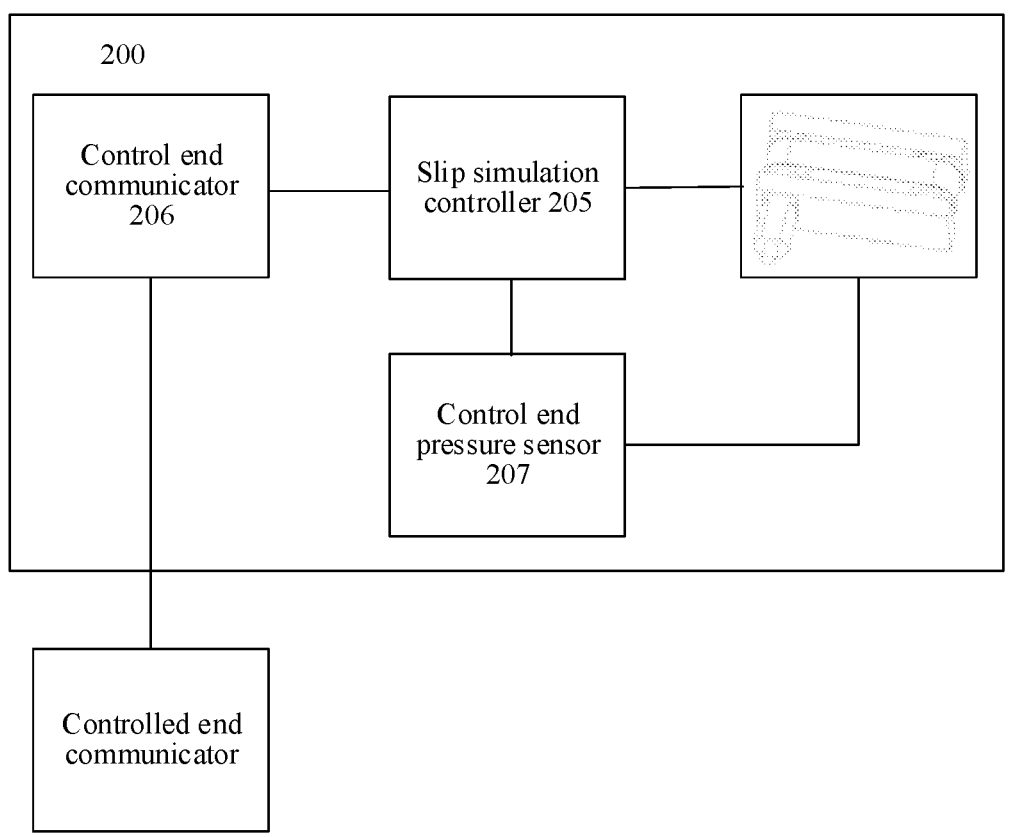
FIG. 2B is a schematic structural block diagram of the slip simulation apparatus according to embodiment(s) of the present disclosure.
Figure 2C:
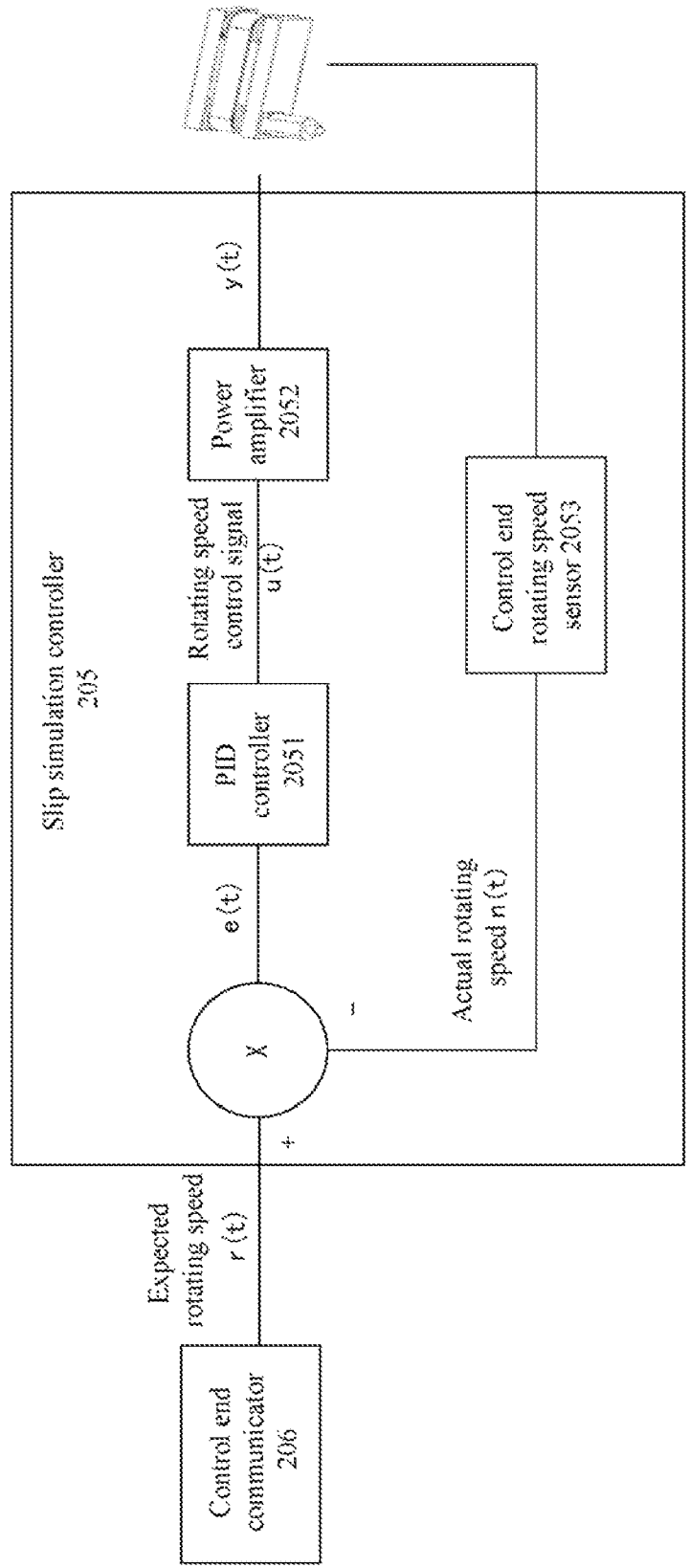
FIG. 2C is a schematic diagram of a control principle of the slip simulation apparatus according to embodiment(s) of the present disclosure.

FIG. 2A is a schematic structural diagram of a slip simulation apparatus 200 according to an embodiment of the present disclosure. FIG. 2B is a structural block diagram of the slip simulation apparatus 200 according to an embodiment of the present disclosure. FIG. 2C is a diagram of a control principle of the slip simulation apparatus 200 according to an embodiment of the present disclosure.

Referring to FIG. 2A, the slip simulation apparatus 200 of the embodiments of the present disclosure may be similarly mounted in a game handle as shown in FIG. 1 or may be used independently to provide slip simulation to a user. For ease of description, in FIG. 2A, an example in which the apparatus 200 is independently used is used to describe the structure of the apparatus below. However, a person skilled in the art is to understand that the slip simulation apparatus 200 may be used as one of a built-in component or an independent component of any related device to provide slip simulation to a user. This is not limited in the embodiments of the present disclosure.

For example, the slip simulation apparatus 200 includes: a base 201; at least one motor 204 arranged on the base 201; and a slip simulation controller 205, configured to: receive slip data, and generate a rotating speed control signal used for controlling the at least one motor 204.

Each motor 204 in the at least one motor 204 is provided with at least one synchronous wheel 203, at least one limit apparatus 206, and at least one synchronous belt 202 associated with the motor 204. The at least one synchronous belt 202 is sleeved on the at least one synchronous wheel 203 and the limit apparatus 206. The motor 204 is drivingly connected to the at least one synchronous wheel 203 to drive, according to the rotating speed control signal, the at least one synchronous wheel 203 and the at least one synchronous belt 202 to rotate.

For ease of description, only one motor 204, one synchronous belt 202, one limit apparatus 206, and one synchronous wheel 203 are shown in FIG. 2A. However, in some embodiments, there may be at least two synchronous wheels, at least two limit apparatuses, and at least two synchronous belts. A person skilled in the art is to understand that the quantities of the motors, the synchronous wheels, the limit apparatuses, and the synchronous belts are not limited in the embodiments of the present disclosure. In FIG. 2A, the synchronous wheel 203 directly sleeved on the motor 204 is a driving wheel, and the limit apparatus 206 is a driven wheel. The driving wheel drives the driven wheel to rotate. A person skilled in the art is to understand that the limit apparatus 206 may be replaced with a mechanical component that can play a similar role, for example, an arc-shaped steel plate and a support rod, as long as the component can implement the function of assisting in the rotation of the synchronous belt 202.

It is to be understood that after the synchronous belt 202 is sleeved on the synchronous wheel 203, the synchronous belt 202 forms an arc-shaped portion respectively in contact with the synchronous wheel 203, and two flat portions located between the limit apparatus 206 and the synchronous wheel 203. The user may put a finger on the flat portion, and perceive a simulated slip by perceiving the rotation of the synchronous belt.

Slip data can represent the shearing force perceived by a controlled object. The apparatus 200 may provide a slip to the user based on the slip data, so that the user may perceive a shearing force similar to the shearing force perceived by the controlled object. For example, it is assumed that the controlled object is a game character in a virtual game, the game character in the virtual game tries to hold a stick, and the stick may slide downward because the stick is too heavy or the surface of the stick is too smooth. When the finger of the user presses or touches the synchronous belt 202, the synchronous belt 202 may rotate forward or backward under the operation of the motor 204. In certain embodiment(s), the user may perceive the sliding of the synchronous belt 202 to perceive the downward sliding of the stick. In another example, it is assumed that the controlled object is a fishing robot, and the fishing robot tries to grab a swimming fish by hand. In certain embodiment(s), when the finger of the user touches the synchronous belt 202, the user may perceive the sliding of the synchronous belt 202 to simulate the swimming of fish through the hand. Therefore, the apparatus 200 simulates touching of a sliding object through the movement of the synchronous belt 202.

Because the synchronous belt 202 is driven by the motor 204 to continuously rotate, the apparatus 200 may provide a continuous slip feedback to the user. In addition, because the rotating speed of the motor 204 is controlled by the rotating speed control signal outputted by the slip simulation controller 205, the motor 204 may make the synchronous belt 202 rotate at different speeds, so that the apparatus 200 provides slips at different speeds to the user. When the speed of the motor 204 is faster, the shearing force provided by the apparatus 200 is greater, thereby simulating a more obvious slip for the user.

Referring to FIG. 2B and FIG. 2C, the apparatus 200 may further include a control end communicator 206. The control end communicator 206 is communicably connected to the slip simulation controller 205. The control end communicator 206 is configured to receive slip data from a controlled end communicator. The slip simulation controller 205 is further configured to: receive slip data from the control end communicator 206, and generate, based on the slip data, the rotating speed control signal used for controlling the at least one motor, to control a rotating speed of the at least one motor 204.

The control end communicator 206 may be connected to the controlled end communicator by a network. A communicable connection refers to that devices may communicate with each other directly or indirectly, for example, may transmit and receive data and/or a signal to and from each other through the network. The network may be an Internet and/or telecommunication network-based Internet of Things, which may be a wired network or a wireless network. For example, the network may be an electronic network that can implement a function of information exchange, such as, a local area network (LAN), a metropolitan area network (MAN), a wide area network (WAN), and a cellular data communication network.

After the control end communicator 206 receives the transmitted slip data, the slip simulation controller 205 may convert a sliding direction and a sliding speed of a controlled end into a rotating speed control signal to control an output rotating speed of the at least one motor 204, to make the at least one synchronous belt 202 reach a corresponding rotating speed.

For example, the slip simulation controller 205 further includes a proportional-integral-derivative (PID) controller 2051, configured as at least one control end rotating speed sensor 2053 and a power amplifier 2052 for obtaining an actual rotating speed of the at least one motor 204. In some embodiments, a speed sensor-less control strategy may be applied in the slip simulation controller 205. For example, a speed observer is used for estimating the rotating speed of the at least one motor. In certain embodiment(s), the at least one control end rotating speed sensor 2053 may be omitted, or may be replaced with a speed observer 2053'.

For example, the motor 204 may be a low-power direct current motor, and the control end rotating speed sensor 2053 may be an encoder built inside the motor 204. The encoder may directly obtain actual rotating speed data n(t) of the at least one motor 204, where t represents a moment, and n(t) represents the actual rotating speed of the motor 204 at the moment t. An actual speed of the synchronous belt 202 associated with the motor 204 may be calculated through the rotating speed of the motor 204, to determine the sliding speed. With a built-in encoder of at least one motor 204 as the control end rotating speed sensor 2053, the structure can be simplified and manufacturing is facilitated.

In another example, the control end rotating speed sensor 2053 may be a sensor that senses the rotating speed of the synchronous belt 202. The control end rotating speed sensor 2053 may be arranged on the base 201 to detect the rotating speed of the synchronous belt 202. The actual rotating speed data n(t) of the motor 204 associated with the synchronous belt may be derived from the rotating speed of the synchronous belt.

The control end rotating speed sensor 2053 may be electrically connected or communicably connected to the PID controller 2051. The PID controller refers to a controller that controls a mechanical component through a PID control rule. For each motor 204, the PID controller 2051 generates the rotating speed control signal according to the rotating speed data of the motor and the rotating speed control signal.

For example, when the at least one motor 204 is a low-power direct current motor, the rotating speed control signal may be converted into a motor voltage control signal. The motor voltage control signal indicates a direct current voltage applied to the motor 204. As a result, the slip simulation controller 205 adjusts the rotating speed of the motor 204 by adjusting a voltage applied to the motor 204.

For example, the PID controller 2051 may combine an expected rotating speed r(t) with the actual rotating speed data n(t) obtained by the control end rotating speed sensor 2053 according to the PID control rule for calculation and analysis, to adjust the rotating speed of the at least one motor 204. The expected rotating speed r(t) represents a rotating speed expected to be reached by the motor 204 at the moment t, which may be indicated by the slip data.

The method for adjusting the speed of the at least one motor 204 by the slip simulation controller 205 includes: calculating, by the slip simulation controller 205, the expected rotating speed r(t) of the motor 204 according to the slip data. The control end rotating speed sensor 2053 senses the actual speed n(t) of the at least one motor 204. The slip simulation controller 205 compares the expected rotating speed r(t) with the actual rotating speed n(t), and calculates a difference e(t)=r(t)−n(t). The PID controller 2051 calculates a rotating speed control signal u(t) according to the difference e(t). The rotating speed control signal u(t) represents a signal for controlling the rotating speed of the motor at the moment t. In some embodiments, u(t) may be converted into the motor voltage control signal y(t) through a simple linear change. y(t) represents a motor drive voltage at the moment t. In certain embodiment(s), in some embodiments, u(t) may obtain the motor voltage control signal y(t) simply through the power amplifier 2052, and drive at least one motor 204 to change the rotating speed of the motor by changing the voltage of the motor 204, thereby implementing slide simulation.

The apparatus 200 may further include a control end pressure sensor 207. The control end pressure sensor 207 is communicably connected to the slip simulation controller 205, and is configured to sense the pressure applied to the at least one synchronous belt and generate a pressure detection signal. The slip simulation controller 205 is further configured to: receive the pressure detection signal from the control end pressure sensor 207, and convert the pressure detection signal into pressure control data. The control end communicator 206 is further configured to: receive the pressure control data from the slip simulation controller 205, and transmit the pressure control data to the controlled end communicator.

For example, the control end pressure sensor 207 may be arranged at the bottom of the base 201. After the user applies pressure to the synchronous belt, that is, applies pressure to the entire slip simulation apparatus 200, the control end pressure sensor 207 at the bottom of the base 201 may be used for sensing the pressure on the entire slip simulation apparatus 200. In another example, the control end pressure sensor 207 may be arranged in a contact gap between the synchronous belt and the base 201, so that the pressure applied by the user may be sensed. A person skilled in the art is to understand that the control end pressure sensor 207 may be arranged at another appropriate position of the apparatus 200 as desirable, as long as the control end pressure sensor 207 can sense the pressure applied by the user. The control end pressure sensor 207 may convert the detected pressure into the pressure detection signal, and then transmit the pressure detection signal to the slip simulation controller 205.

After receiving the pressure detection signal from the control end pressure sensor 207, the slip simulation controller 205 may convert the pressure detection signal into pressure control data. The pressure control data is used for controlling a pressure applied by the controlled object to the outside. The control end communicator 206 receives the pressure control data from the slip simulation controller 205, and transmits the pressure control data to the controlled end communicator. For example, when the controlled object is a robot finger or a clamper, after receiving the pressure control data through the built-in controlled end communicator of the controlled object, the controlled object may change a grip force or a pressing force of the robot finger according to the pressure control data. In another example, when the controlled object is a virtual character in a virtual game, the controlled virtual character may adjust, according to the pressure control data, a force applied to another virtual object.

The slip simulation apparatus 200 uses the synchronous belt to simulate a slip. Because the synchronous belt can rotate infinitely without a displacement range constraint, the slip simulation apparatus 200 can provide a continuous slip simulation.

Figure 3:
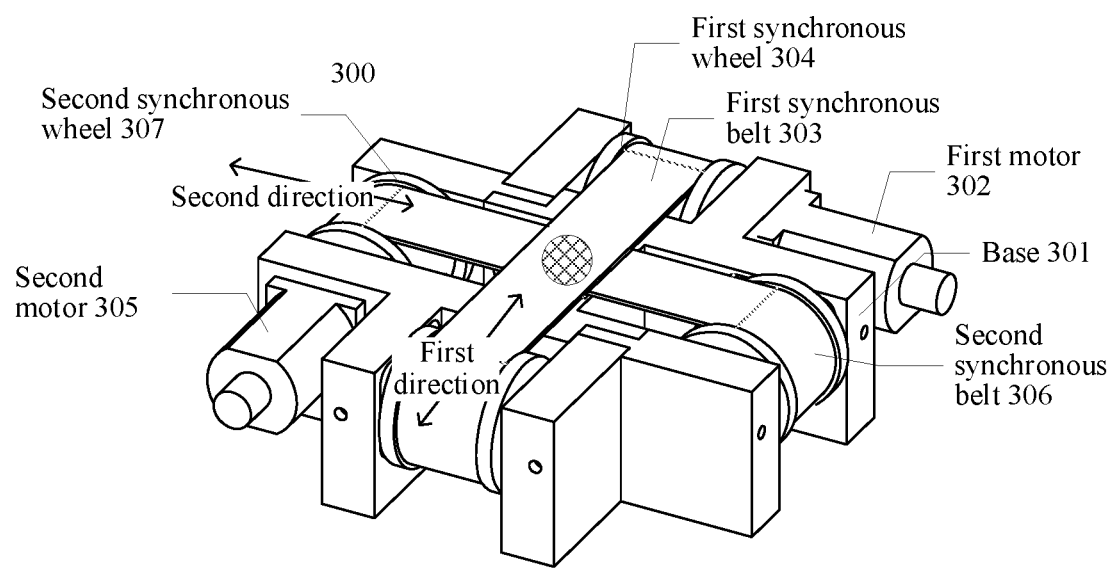
FIG. 3 is a schematic structural diagram of a slip simulation apparatus according to embodiment(s) of the present disclosure.

FIG. 3 is a schematic structural diagram of another slip simulation apparatus 300 according to an embodiment of the present disclosure.

Referring to FIG. 3, the slip simulation apparatus 300 of the embodiments of the present disclosure may be similarly mounted in a game handle as shown in FIG. 1, or may be used independently to provide slip simulation to a user. For ease of description, in FIG. 3, an example in which the apparatus 300 is independently used is used to describe the structure of the apparatus below. However, a person skilled in the art is to understand that this is not limited in the embodiments of the present disclosure.

For example, the slip simulation apparatus 300 includes a base 301. The base 301 is similar to the base 201 and is provided with a first synchronous belt 303, a second synchronous belt 306, a first synchronous wheel 304, a second synchronous wheel 307, a first motor 302, and a second motor 305. The apparatus 300 may further similarly include the slip simulation controller 205 in the apparatus 200. In some embodiments, the apparatus 300 may further include a control end communicator 206 and the control end pressure sensor 207.

The first motor 302 and the second motor 305 are similar to the motor 204. Therefore, details are not described herein again.

The synchronous wheel associated with the first motor 302 is the first synchronous wheel 304, and the synchronous belt associated with the first motor 302 is the first synchronous belt 303.

The synchronous wheel associated with the second motor 305 is the second synchronous wheel 307, and the synchronous belt associated with the second motor 305 is the second synchronous belt 306.

One end of the first synchronous belt 303 is sleeved on the first synchronous wheel 304, and the other end of the first synchronous belt 303 is sleeved on the limit apparatus associated with the first motor 302. The first motor 302 is drivingly connected to the first synchronous wheel 304 to drive the first synchronous wheel 304 and the first synchronous belt 303 to rotate.

One end of the second synchronous belt 306 is sleeved on the second synchronous wheel 307, and the other end of the second synchronous belt 306 is sleeved on the limit apparatus associated with the second motor 305. The second motor 305 is drivingly connected to the second synchronous wheel 307 to drive the second synchronous wheel 307 and the second synchronous belt 306 to rotate.

An extending direction of the first synchronous belt 303 is a first direction, an extending direction of the second synchronous belt 306 is a second direction, and the first direction and the second direction intersect. In some embodiments, the first direction is perpendicular to the second direction, and the first synchronous belt 303 and the second synchronous belt 306 have an overlapping portion (for example, which is a grid region in FIG. 3) in a direction perpendicular to a plane formed by the first direction and the second direction.

The first synchronous belt 303 and the second synchronous belt 306 are placed crosswise (as shown in FIG. 3, the first synchronous belt 303 is overlapped on top of the second synchronous belt 306). Axial directions of rotating shafts of the first synchronous wheel 304 and the second synchronous wheel 307 are different.

Only a first synchronous belt 303 and a second synchronous belt 306 are shown in FIG. 3. However, a person skilled in the art is to understand that there may be a plurality of first synchronous belts 303 and a plurality of second synchronous belts 306. Quantities of the first synchronous belt 303 and the second synchronous belt 306 are not limited in the embodiments of the present disclosure.

For example, when the finger of the user presses the grid region in FIG. 3, the first synchronous belt 303 may rotate forward or backward in the first direction under the operation of the first motor 302. In certain embodiment(s), the user may perceive sliding of the first synchronous belt 303 in the first direction. In certain embodiment(s), the apparatus 300 uses the movement of the first synchronous belt 303 to simulate touching of an object sliding in the first direction by the user.

When the second synchronous belt 306 rotates forward or backward in the second direction with the operation of the second motor 305, because the second synchronous belt 306 is in contact with the first synchronous belt 303, when pressing the grid region, the user may perceive the slide of the second synchronous belt 306 through the first synchronous belt 303. In certain embodiment(s), the apparatus 300 uses the movement of the second synchronous belt 306 to simulate touching of the object sliding in the second direction by the user via a layer of material. If the user directly presses the second synchronous belt 306, the user may perceive the sliding of the second synchronous belt 306 in the second direction.

In some embodiments, the second synchronous belt 306 and the first synchronous belt 303 may rotate simultaneously. When the finger of the user presses the grid region in FIG. 3, the user may simultaneously perceive sliding in two directions. The user can perceive the sliding in a 360-degree direction by controlling the respective rotating speeds of the first synchronous belt 303 and the second synchronous belt 306. In certain embodiment(s), the finger of the user presses the grid region. However, a person skilled in the art is to understand that when the finger presses another position of the first synchronous belt and the second synchronous belt, the apparatus 300 can still provide a slip feedback to the user.

For example, the first synchronous belt 303 and the second synchronous belt 306 may rotate at different speeds by changing the rotating speeds of the first motor 302 and the second motor 305, thereby providing slip feedbacks at different speeds to the user. Compared with the apparatus 100, because the first synchronous belt 303 and the second synchronous belt 306 may continuously rotate in the first direction and the second direction without a displacement range constraint, the apparatus 300 can provide a continuous slip simulation, and slide simulation in different directions and at different speeds can be implemented by using two-direction sliding synthesis, the structure is simple, manufacturing is easy, the cost is low, and the user perceives a sliding speed and direction of a controlled end device in real time.

Figure 4A:
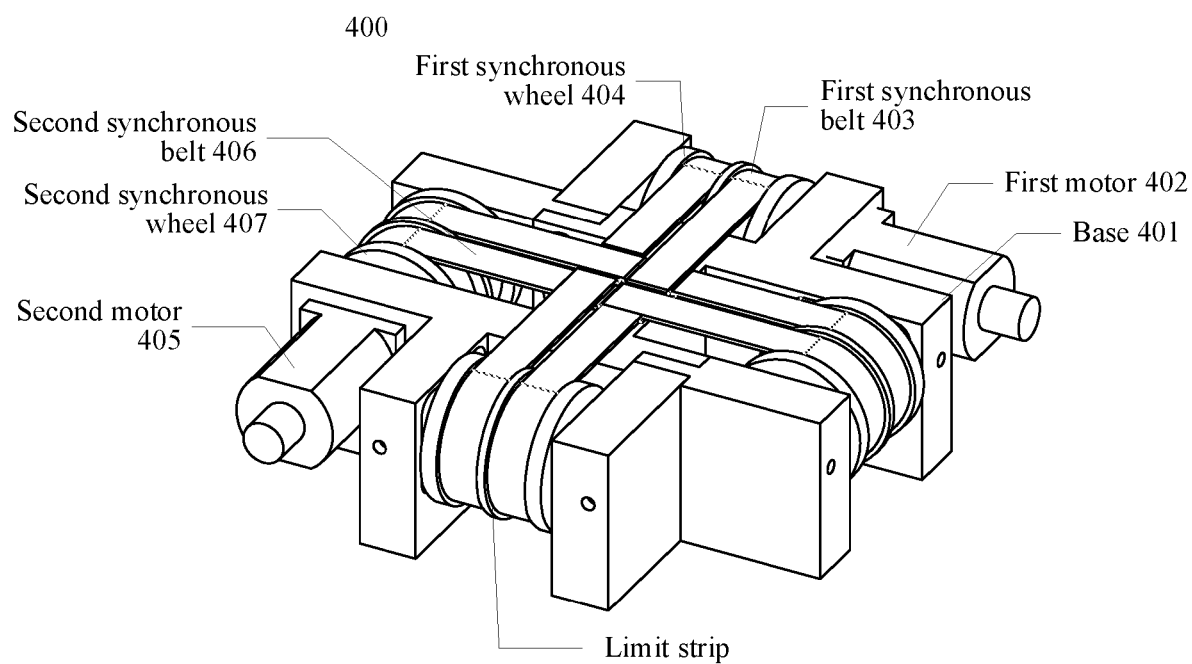
FIG. 4A is a schematic structural diagram of a slip simulation apparatus according to embodiment(s) of the present disclosure.
Figure 4B:
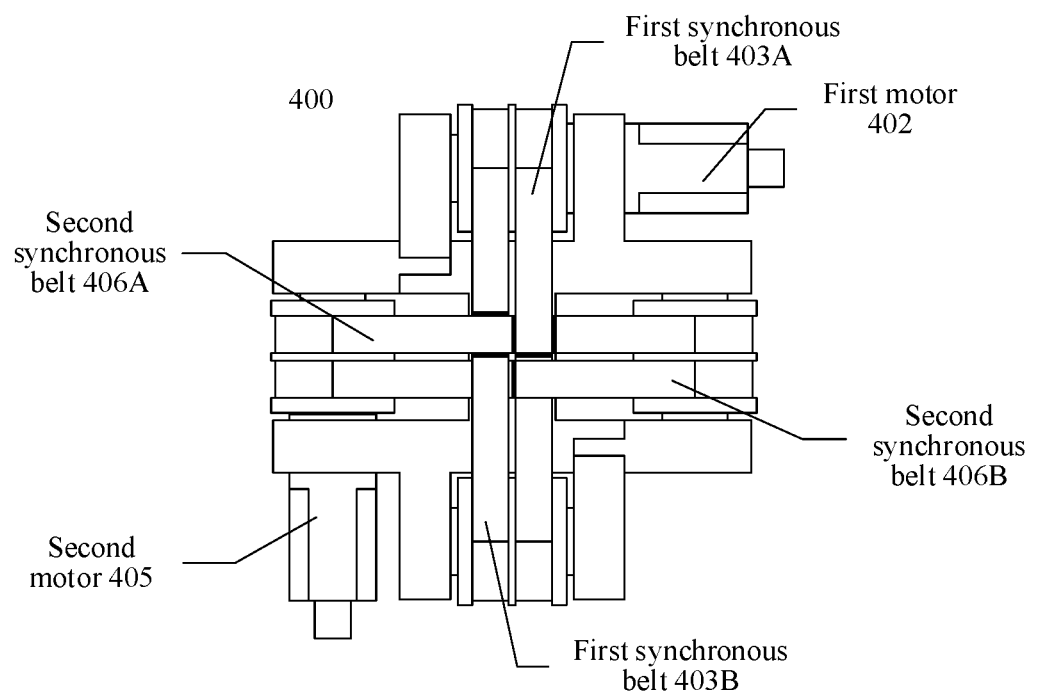
FIG. 4B is a schematic top view of the slip simulation apparatus according to embodiment(s) of the present disclosure.
Figure 4C:
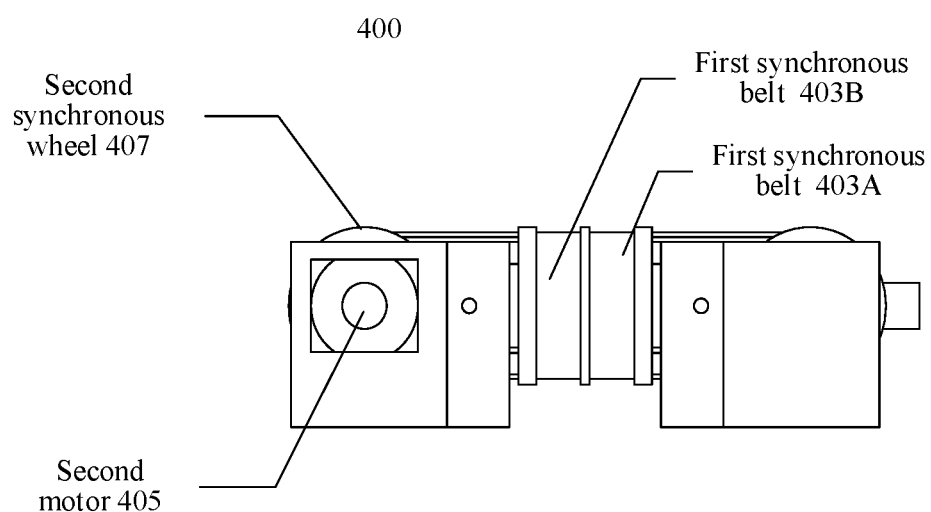
FIG. 4C is a schematic front view of the slip simulation apparatus according to embodiment(s) of the present disclosure.
Figure 4D:
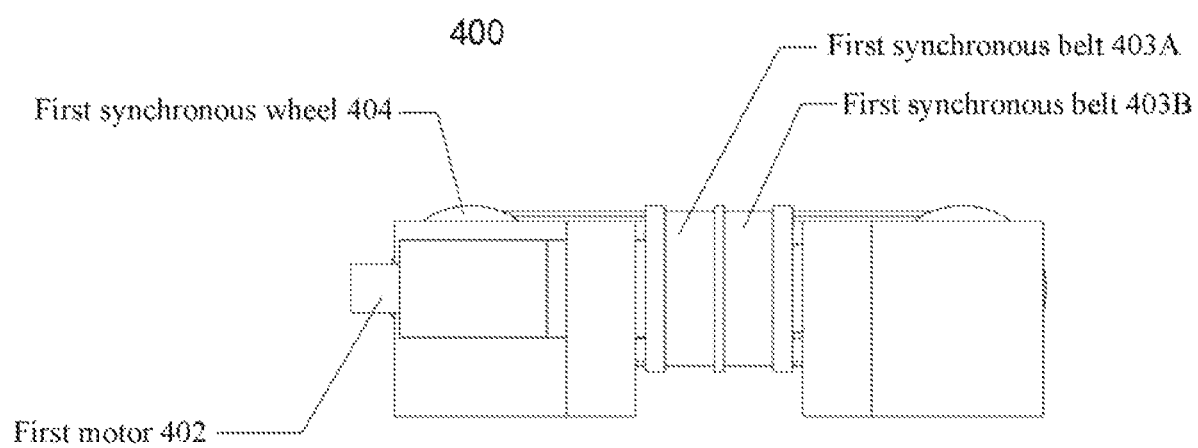
FIG. 4D is a schematic rear view of the slip simulation apparatus according to embodiment(s) of the present disclosure.
Figure 4E:
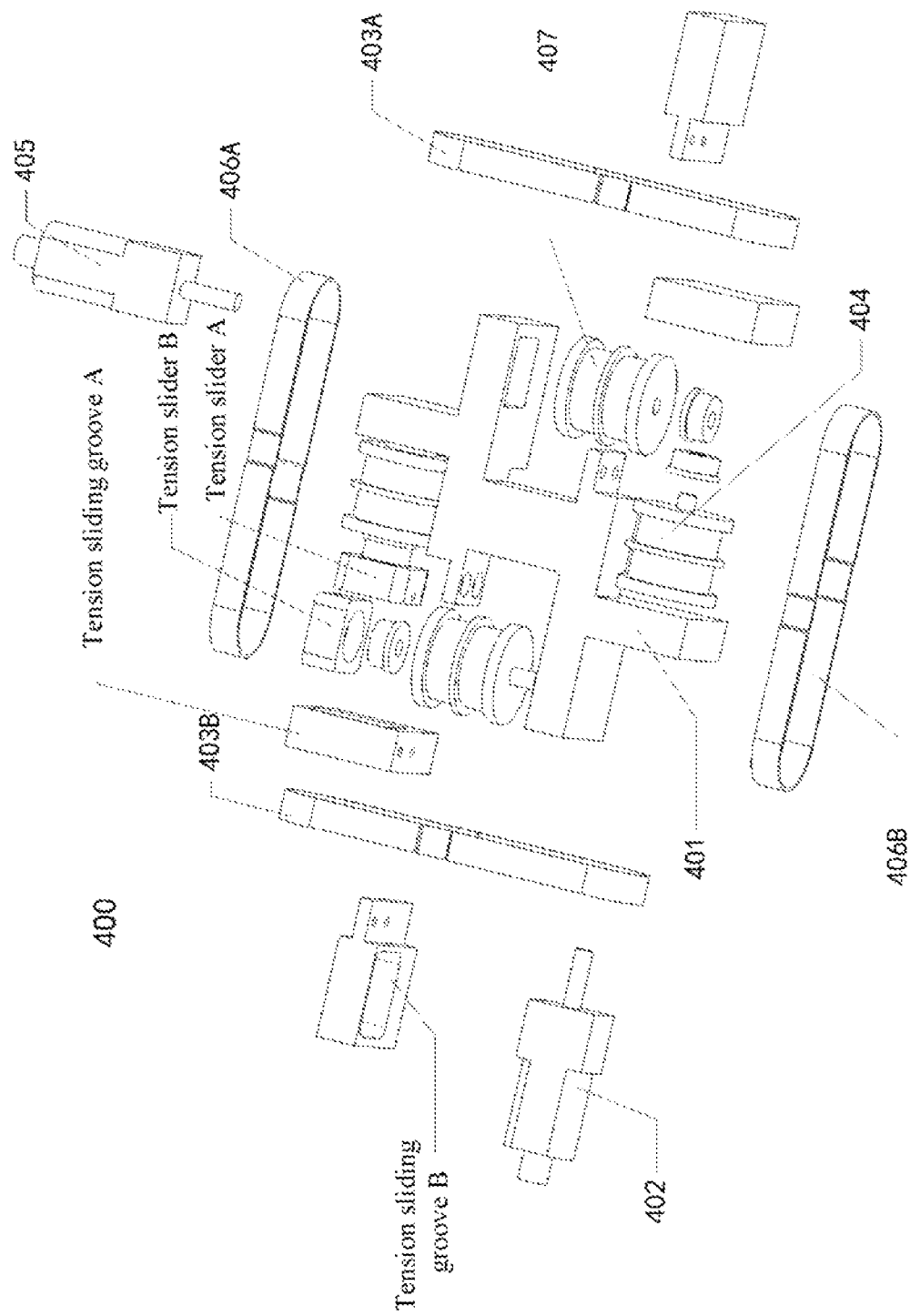
FIG. 4E is a schematic exploded view of the slip simulation apparatus according to embodiment(s) of the present disclosure.

FIG. 4A is a schematic structural diagram of a slip simulation apparatus 400 according to an embodiment of the present disclosure. FIG. 4B is a top view of the slip simulation apparatus 400 according to an embodiment of the present disclosure. FIG. 4C is a front view of the slip simulation apparatus 400 according to an embodiment of the present disclosure. FIG. 4D is a rear view of the slip simulation apparatus 400 according to an embodiment of the present disclosure. FIG. 4E is an exploded view of the slip simulation apparatus 400 according to an embodiment of the present disclosure.

The slip simulation apparatus 400 includes a base 401. A function of the base 401 is similar to the base 201 and the base 301. The base 401 provides structural support for another component of the slip simulation apparatus 400. The apparatus 400 may further similarly include the control end communicator 206 in the apparatus 200. In some embodiments, the apparatus 200 may further include a slip simulation controller 205 and the control end pressure sensor 207.

A first synchronous belt 403A and a first synchronous belt 403B are sleeved on a first synchronous wheel 404 and a limit apparatus associated with a first motor 402. The first motor 402 is drivingly connected to the first synchronous wheel 404 to drive the first synchronous wheel 404, the first synchronous belt 403A, and the first synchronous belt 403B to rotate. In some embodiments, the first synchronous belt 403A and the first synchronous belt 403B are parallel to each other, and the first synchronous belt 403A and the first synchronous belt 403B are separated by a limit strip on the first synchronous wheel 404.

In some embodiments, a second synchronous belt 406A and a second synchronous belt 406B are sleeved on a second synchronous wheel 407 and a limit apparatus associated with a second motor 405. The second motor 405 is drivingly connected to the second synchronous wheel 407 to drive the second synchronous wheel 407, the second synchronous belt 406A, and the second synchronous belt 406B to rotate. In some embodiments, the second synchronous belt 406A and the second synchronous belt 406B are parallel to each other, and the second synchronous belt 406A and the second synchronous belt 406B are separated by a limit strip on the second synchronous wheel 407.

In some embodiments, the synchronous wheels are cylindrical, and there is a limit strip in the middle, so that staggered friction between a set of parallel synchronous belts can be prevented, making it convenient for the user to perceive the sliding.

The second synchronous belt 406A and the second synchronous belt 406B intersect and overlap with the first synchronous belt 403A and the first synchronous belt 403B respectively. It is to be understood that, after the second synchronous belt 406A and the second synchronous belt 406B are sleeved on the second synchronous wheel 407 and the limit apparatus associated with the second motor 405, the second synchronous belt 406A and the second synchronous belt 406B form two arc-shaped portions that are in contact with the second synchronous wheel 407 and the limit apparatus associated with the second motor 405, and two flat portions located between the second synchronous wheel 407 and the limit apparatus associated with the second motor 405. At least two flat portions on the second synchronous belt 406A and the second synchronous belt 406B are in contact with the flat portions of the first synchronous belt 403A and the first synchronous belt 403B. The second direction in which the second synchronous belt 406A and the second synchronous belt 406B rotate and the first direction in which the first synchronous belt 403A and the first synchronous belt 403B rotate intersect.

When the user places a finger on an overlapping flat portion of the synchronous belt, rotation of the second synchronous belt 406A, the second synchronous belt 406B, the first synchronous belt 403A, and the first synchronous belt 403B can be directly transferred to the finger of the user. In certain embodiment(s), the user may determine an overall direction and speed of real sliding according to a superposition of sliding of the second synchronous belt 406A, the second synchronous belt 406B, the first synchronous belt 403A, and the first synchronous belt 403B, allowing the user to perceive a full range of movement. For example, it is assumed that both the first synchronous belt 403A and the first synchronous belt 403B rotate forward in the first direction, and both the second synchronous belt 406A and the second synchronous belt 406B rotate forward in the second direction. In a case that the first direction is perpendicular to the second direction and the first motor 402 and the second motor 405 have the same rotating speed, the user perceives a shearing force generally in a direction of an angle of 45° between the first direction and the second direction.

In some embodiments, the first direction is perpendicular to the second direction. In certain embodiment(s), the overall direction and speed of the real sliding may be decomposed into speeds in two perpendicular directions. In certain embodiment(s), the second synchronous belt 406A, the second synchronous belt 406B, the first synchronous belt 403A, and the first synchronous belt 403B simulate transverse and longitudinal sliding speeds respectively, so that an algorithm can be simplified, thereby facilitating simulation in a plurality of directions. In certain embodiment(s), the first direction and the second direction may also intersect at another angle, and the first direction and the second direction are not parallel and can be synthesized into a speed in any direction. This is not limited in the embodiments of the present disclosure.

In some embodiments, outer surfaces of the second synchronous belt 406A and the second synchronous belt 406B are provided with different concave-convex textures different from those of the first synchronous belt 403A and the first synchronous belt 403B. When the synchronous belts slide, the user may distinguish between the synchronous belts by using different raised texture touches on the surface.

In some embodiments, thicknesses of the synchronous belts may be less than 1 mm. The thickness facilitates the sliding of the synchronous belts and reduces wear, and also facilitates perception of the user. In certain embodiment(s), this is not limited in the embodiments of the present disclosure.

In some embodiments, the synchronous belts are made of rubber with a smooth inner surface, so that a friction force when the synchronous belts are in contact can be reduced, and effective transmission with the synchronous wheel can be simultaneously satisfied.

In some embodiments, the base 401 is further provided with four tension sliders and a tension sliding groove. The tension sliding groove is arranged on the base. The tension sliders are slidably arranged inside the tension sliding groove. A sliding direction of the tension sliders is an arrangement direction of the synchronous wheels connected to the tension sliders. A limit jackscrew is connected to the base 401, and extends into the tension sliding groove to contact the tension slider to limit a position of the tension slider in the tension sliding groove. The synchronous wheel is rotatably connected to the tension slider by a shaft. With the cooperation of the limit jackscrew and the tension slider, the synchronous wheel may be controlled to move back and forth in a rotating direction of a corresponding synchronous belt, and the tension of the synchronous belt can be adjusted, to facilitate control of tightness adjustment of the contact between the plurality of synchronous belts.

In some embodiments, the base includes a base plate, two transverse detachable side plates, and two longitudinal detachable side plates. The two transverse detachable side plate are arranged in parallel and opposite each other, and are both fixedly connected to the base plate. The first synchronous wheel 404/the second synchronous wheel 407 is rotatably arranged on the base plate and between the transverse detachable side plates. The first motor 402 is fixedly connected to the base plate. The two longitudinal detachable side plate are arranged in parallel and opposite each other, and are both fixedly connected to the base plate. The first synchronous wheel 404/the second synchronous wheel 407 is rotatably arranged on the base plate and between the longitudinal detachable side plates. The second motor 405 is fixedly connected to the base plate.

The apparatus 400 uses a multi-synchronous belt structure in which a plurality of synchronous belts cooperate, so that infinite rotation without a displacement range constraint can be implemented, a continuous slip simulation can be provided, and two-direction sliding synthesis can be further used to implement slide simulation in different directions and at different speeds. The structure is simple, manufacturing is easy, the cost is low, and the user perceives the sliding speed and direction of the controlled object in real time, to transmit a control signal to the controlled object in real time to change the sliding speed of the controlled object.

Figure 5A:
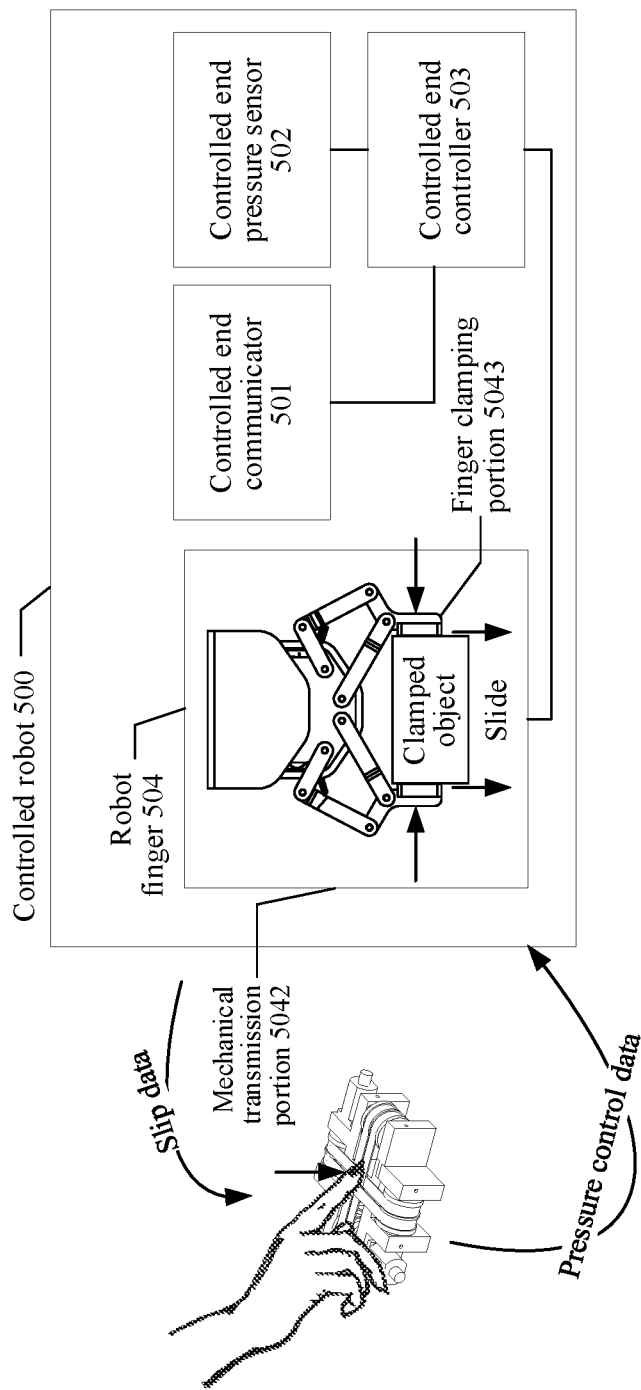
FIG. 5A is a schematic diagram of a controlled robot according to embodiment(s) of the present disclosure.
Figure 5B:
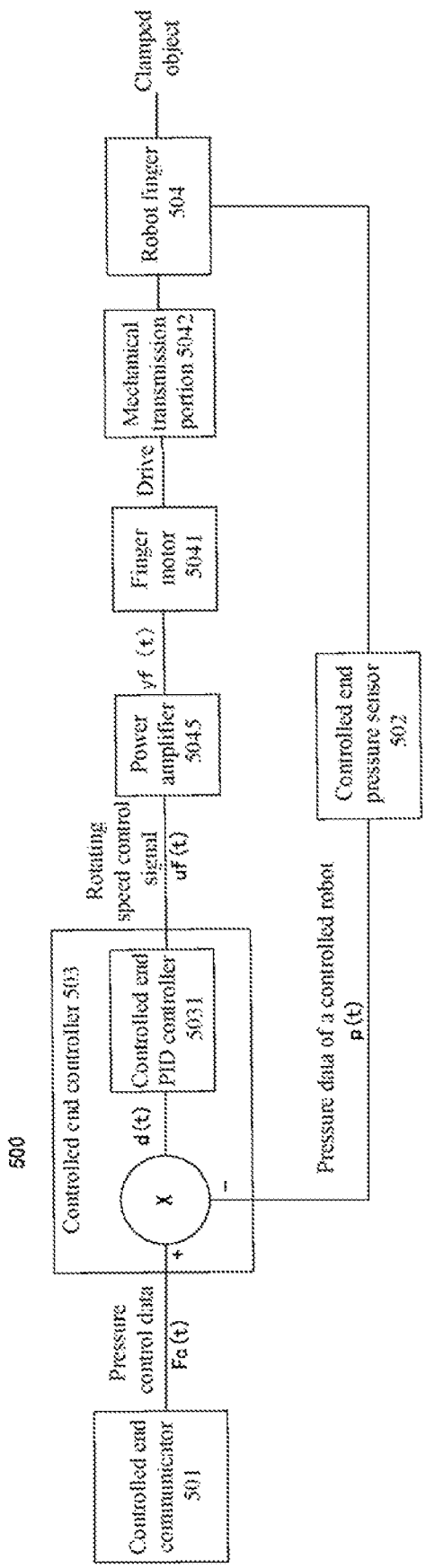
FIG. 5B is a schematic diagram of a control principle of the controlled robot according to embodiment(s) of the present disclosure.

FIG. 5A is a schematic diagram of a controlled robot 500 according to an embodiment of the present disclosure. FIG. 5B is a frame diagram of the controlled robot 500 according to an embodiment of the present disclosure.

Referring to FIG. 5A, the controlled robot 500 includes a controlled end communicator 501, a controlled end pressure sensor 502, and a controlled end controller 503.

The controlled end communicator 501 is configured to: receive pressure control data, and transmit slip data to any one of the slip simulation apparatus 200, the slip simulation apparatus 300, or the slip simulation apparatus 400. An example in which the slip data is transmitted to the slip simulation apparatus 400 is used for description below. However, a person skilled in the art is to understand that this is not limited in the embodiments of the present disclosure.

Slip data can represent a shearing force perceived by the controlled robot. For example, in FIG. 5A, when the controlled robot 500 tries to grip a clamped object, the clamped object may slide downward. The controlled robot 500 may sense that the clamped object slides downward to generate slip data, and then transmit the slip data to the slip simulation apparatus 400. Then the slip simulation apparatus 400 may adjust rotation of the synchronous belt through the slip data, to simulate a state that the clamped object slides downward. When the finger of the user presses the synchronous belt, the user may perceive the state in which the clamped object slides downward, so that the slip simulation apparatus 400 provides a slip to the user.

When the finger of the user touches the flat portion where the synchronous belt of the slip simulation apparatus 400 overlaps, the sliding of the clamped object may be perceived. Then the slip simulation apparatus 400 feeds back the pressure control data to the controlled robot 500. For example, it is assumed that the user applies an appropriate pressing force to the slip simulation apparatus 400. As described above, the control end pressure sensor in the slip simulation apparatus 400 may sense the pressure applied by the user, and then generate a pressure detection signal. The slip simulation controller in the slip simulation apparatus 400 may convert the pressure detection signal into the pressure control data, and output the pressure control data to the controlled end communicator 501 of the controlled robot 500 through the control end communicator in the slip simulation apparatus 400.

The controlled end pressure sensor 502 is configured to: detect a pressure applied by the controlled robot 500, and generate pressure data of the controlled robot 500. For example, when the controlled robot has a robot finger, the controlled end pressure sensor 502 may be mounted on the robot finger to detect a force applied by the robot finger to another object.

The controlled end controller 503 is communicably connected to the controlled end communicator 501 and the controlled end pressure sensor 502. The controlled end controller 503 is configured to: adjust, according to the pressure data and the pressure control data of the controlled robot 500, the pressure applied by the controlled robot 500; and convert the pressure data of the controlled robot 500 into the slip data, and transmit the slip data to the controlled end communicator 501.

It is assumed that the user touches the slip simulation apparatus 400 to perceive that the clamped object slides downward, the user may try to increase a pressure to stop the clamped object from sliding. Therefore, the pressure control data instructs the controlled robot to increase the pressure applied to the clamped object. The controlled end controller 503 may compare the pressure data and the pressure control data to finally determine the pressure applied by the controlled robot 500 to the clamped object. When the controlled robot 500 increases a clamping force, the clamped object may no longer slide downward. In certain embodiment(s), the controlled end controller 503 may update the slip data according to the pressure data detected by the controlled end pressure sensor 502 (for example, by using a friction force formula, or the like), and then transmit the slip data to the slip simulation apparatus 400 through the controlled end communicator 501.

In some embodiments, as shown in FIG. 5A, the controlled robot 500 further includes a robot finger 504. The robot finger 504 includes a finger motor 5041 (not shown in figure), a mechanical transmission portion 5042, and a finger clamping portion 5043. The finger motor 5041 drives the robot finger 504. The controlled end controller 503 is configured to control a clamping force of the robot finger (that is, to adjust the pressure applied by the controlled robot). In some embodiments, the controlled end controller 503 may generate, according to the pressure data of the controlled robot and the pressure control data, a rotating speed control signal used for controlling the finger motor 5041. The finger motor 5041 drives the mechanical transmission portion 5042. The mechanical transmission portion 5042 drives the finger clamping portion 5043 to adjust a clamping force of the finger clamping portion 5043.

For example, as shown in FIG. 5B, the controlled end controller 503 may include a controlled end PID controller 5031 similar to the PID controller 2051, which may control the rotating speed of the finger motor 5041 according to a PID control rule. For example, the controlled end PID controller 5031 may combine pressure control data Fc(t) with pressure data p(t) of the controlled robot according to the PID control rule for calculation and analysis, to implement a speed adjustment of the finger motor 5041. The pressure control data Fc(t) represents the clamping force that the slip simulation apparatus 400 expects the robot finger to apply to the clamped object at the moment t. The pressure data p(t) of the controlled robot represents the clamping force applied by the robot finger to the clamped object at the moment t.

The controlled end controller 503 compares the pressure control data Fc(t) with the pressure data p(t) of the controlled robot, to obtain a difference d(t)=Fc(t)−p(t). Then, the controlled end PID controller 5031 determines a rotating speed control signal uf(t) of the finger motor 5041 according to d(t). For example, after a conversion between the rotating speed of the motor and the force applied by the robot finger, the controlled end PID controller 5031 determines the rotating speed control signal uf(t) of the finger motor 5041 according to the d(t), which represents a signal for controlling the rotating speed of the motor at the moment t. In some embodiments, u(t) may be converted into a finger motor voltage control signal yf(t) through a simple linear change, and yf(t) represents a drive voltage of the finger motor 5041 at the moment t. In certain embodiment(s), in some embodiments, uf(t) may obtain the finger motor voltage control signal yf(t) simply through the power amplifier 5045, and change the voltage of the finger motor 5041 to drive the finger motor 5041 to change the rotating speed of the finger motor, thereby implementing slide simulation.

The voltage of a drive direct current motor of the finger motor 5041 is changed to change the rotating speed of the finger motor 5041, to adjust the force applied by the robot finger to the clamped object to prevent the clamped object from sliding.

In some embodiments, the pressure control data Fc(t) and the voltage for driving the drive finger motor 2051 may be directly and simply mapped without using the controlled end pressure sensor 502, that is, without using a force applied by an actual robot finger as a feedback, so that the control system and control method can be simplified.

In the controlled robot 500 provided in the embodiments of the present disclosure, when the user uses the slip simulation apparatus to remotely operate the controlled robot 500, the slip simulation apparatus simulates a slip feedback provided by a touch sensor on a fingertip of a robot, enabling the user to perceive sliding direction and speed of the object grasped by the robot. In addition, the controlled end pressure sensor 502 of the controlled robot 500 may assist in perceiving or predicting that the grasped object has slid or is about to slide, and then the controlled robot 500 may generate slip information based on the perceived information, and feed the slip information back to the slip simulation apparatus, to remind the user to react. In the embodiments of the present disclosure, the slip simulation apparatus acquires a reaction of the user and generates a pressure control signal. The controlled robot 500 prevents, based on the pressure control signal, the object from sliding, thereby forming a closed-loop control system.

The slip simulation apparatus provided in the embodiments of the present disclosure is simple and compact, has a small volume, is easy to manufacture, and has a low cost. The algorithm used by the controlled robot provided in the embodiments of the present disclosure is also simple, efficient, and easy to implement.

The slip simulation apparatus provided in the embodiments of the present disclosure can communicate with the controlled robot to simulate the movement of the hand of a robot, and can be applied to another portion of a robot or a scenario such as virtual reality, computer games, and human-computer interaction.

Figure 6:
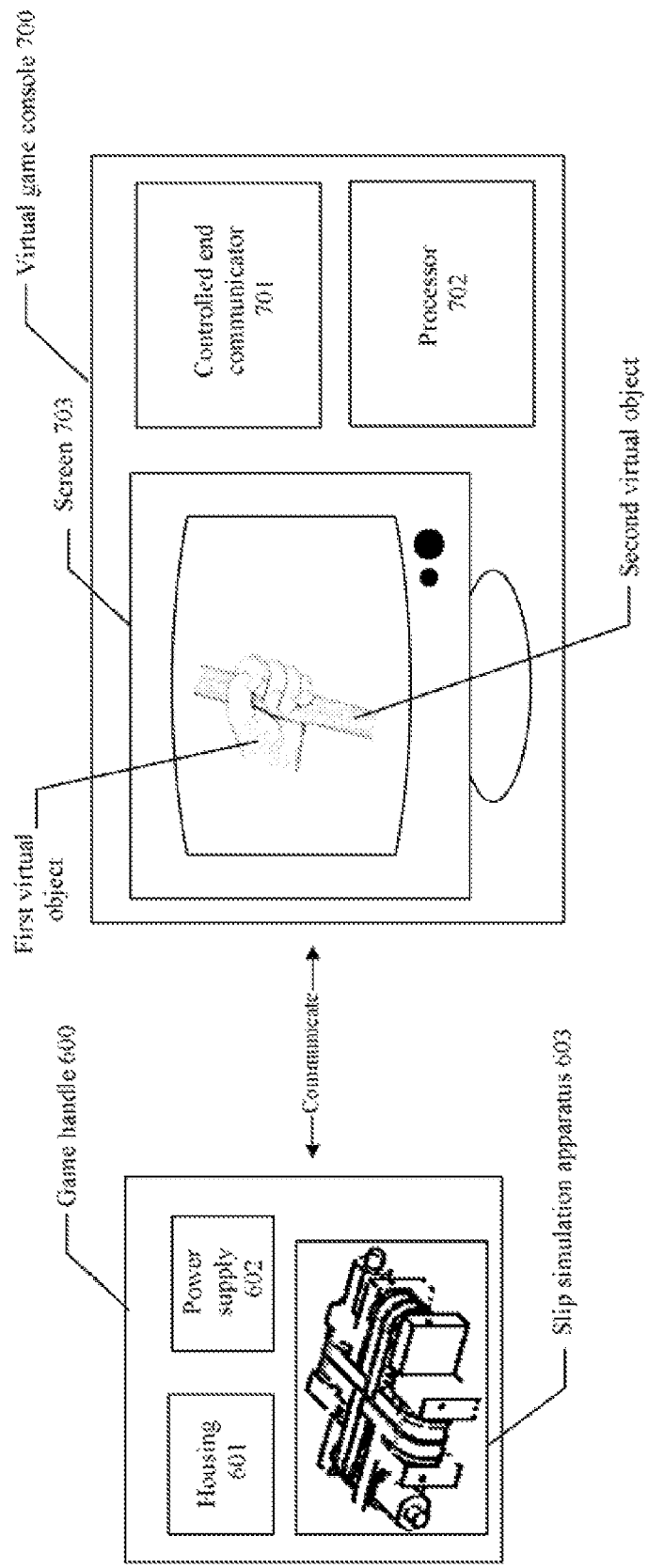
FIG. 6 is a schematic diagram of an interaction of a game handle and a virtual game console according to embodiment(s) of the present disclosure.

FIG. 6 is a schematic diagram of an interaction of a game handle 600 and a virtual game console 700 according to an embodiment of the present disclosure.

As shown in FIG. 6, a game handle 600 of the embodiments of the present disclosure includes a housing 601, a power supply 602, and a slip simulation apparatus 603 arranged inside the housing 601. The slip simulation apparatus 603 may be any one of the slip simulation apparatus 200, 300, and 400 disclosed in the embodiments. The slip simulation apparatus 603 is configured to: receive slip data from a virtual game console, and output pressure control data to the virtual game console, to control a virtual object in a virtual game application, the virtual game application being run in the virtual game console.

The virtual game console 700 of the embodiments of the present disclosure includes a controlled end communicator 701, a processor 702, and a screen 703.

The controlled end communicator 701 is configured to: receive pressure control data from the game handle 600, and transmit slip data to the game handle 600. The controlled end communicator 701 is similar to the controlled end communicator 501 described above. Therefore, details are not described again in the embodiments of the present disclosure.

The processor 702 is configured to run a virtual game application. A first virtual object in the virtual game application is controlled by the game handle. For example, as shown in FIG. 6, the first virtual object may be a person's hand trying to hold a stick. The stick is a second virtual object. The processor 702 is configured to: compute pressure data, the pressure data indicating pressure applied by the first virtual object on the second virtual object; adjust, according to the pressure data and the pressure control data, the pressure applied by the first virtual object on the second virtual object, and update the pressure data; and convert the updated pressure data into the slip data, and transmit the slip data to the controlled end communicator.

According to different game applications, the manner in which the processor 702 calculates the pressure data may be different. This is not limited in this embodiment of the present disclosure.

For example, as shown in FIG. 6, when the first virtual object tries to hold the second virtual object, the second virtual object may slide downward. The processor 702 may perform calculation to determine that the second virtual object slides downward to generate slip data, and then transmit the slip data to the slip simulation apparatus 603. Then the slip simulation apparatus 603 may adjust rotation of the synchronous belt through the slip data, to simulate a state that a clamped object slides downward. When the finger of the user presses the synchronous belt, the user may perceive the state in which the second virtual object slides downward, so that the slip simulation apparatus 603 provides a slip to the user.

It is assumed that the user touches the slip simulation apparatus 603 to perceive that the second virtual object slides downward, the user may try to increase a pressure to stop the second virtual object from sliding. Therefore, the pressure control data transmitted by the slip simulation apparatus 603 instructs the first virtual object to increase the pressure applied to the second virtual object. The processor 702 may compare the pressure data and the pressure control data to finally determine the pressure applied by the first virtual object to the second virtual object. After the first virtual object increases the clamping force, the second virtual object may no longer slide downward. In certain embodiment(s), the processor 702 may update the slip data (for example, by using a friction force formula, or the like), and then transmit the slip data to the slip simulation apparatus 603 through the controlled end communicator 701.

The screen 703 displays the first virtual object and the second virtual object. In some embodiments, the screen 703 may display that the first virtual object is adjusting the pressure applied to the second virtual object. For example, the screen 703 may display a change of the grip force of the first virtual object.

The embodiments of the present disclosure further provides a control system. The control system includes the slip simulation apparatus and the controlled robot; or the game handle and the virtual game console.

The embodiments of the present disclosure provide a slip simulation apparatus, a controlled robot, a game handle, a virtual game console, and a control system. The slip simulation apparatus uses a synchronous belt to simulate a slip. Because the synchronous belt can rotate infinitely without a displacement range constraint, the slip simulation apparatus can provide a continuous slip simulation. In the embodiments of the present disclosure, a plurality of intersecting synchronous belts are further used to implement sliding synthesis in a plurality of directions, thereby implementing slide simulation in different directions and at different speeds. The slip simulation apparatus provided in the embodiments of the present disclosure is simple in structure, easy to manufacture, and low in cost, and allows a user to perceive a sliding speed and direction of a controlled object in real time.

The flowcharts and block diagrams in the accompanying drawings illustrate a system architecture, a function, and an operation that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing specified logic functions. Each box in a block diagram and a combination of boxes in the block diagram may be implemented by using a dedicated hardware-based system configured to perform a specified function or operation, or may be implemented by using a combination of dedicated hardware and a computer instruction.

Various exemplary embodiments of the present disclosure may be implemented in hardware or a dedicated circuit, software, firmware, logic, or any combination thereof. Some aspects can be implemented in hardware, while other aspects can be implemented in firmware or software executable by a controller, a microprocessor, or other computing devices. When various aspects of the embodiments of the present disclosure are illustrated or described as block diagrams, flowcharts, or represented by some other graphs, it is to be understood that the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

The exemplary embodiments of the present disclosure described in detail above are only illustrative, but not restrictive. A person killed in the art is to understand that various modifications and combinations may be made to these embodiments or the features of the embodiments without departing from the principle and spirit of the present disclosure, and such modifications fall within the protection scope of the present disclosure.

What is claimed is:

1. A slip simulation apparatus, comprising:
a base;
at least one motor arranged on the base;
a slip simulation controller, configured to: receive slip data, and generate a rotating speed control signal used for controlling the at least one motor; and
at least one synchronous wheel, at least one synchronous belt, and at least one limit apparatus associated with the motor,
the synchronous belt being sleeved on the synchronous wheel and the limit apparatus, the motor being drivingly connected to the at least one synchronous wheel to drive, according to the rotating speed control signal, the at least one synchronous wheel and the at least one synchronous belt to rotate,
wherein an end of a rotating shaft of a synchronous wheel of the at least one synchronous wheel is sleeved with a tension slider, the tension slider is embedded in a tension sliding groove inside the base, and a position of the tension slider in the tension sliding groove is limited by using a mechanism embedded on the tension sliding groove.

2. The slip simulation apparatus according to claim 1, wherein
the at least one motor comprises a first motor and a second motor, wherein
the synchronous wheel associated with the first motor is a first synchronous wheel, and the synchronous belt associated with the first motor is a first synchronous belt; and
the synchronous wheel associated with the second motor is a second synchronous wheel, and the synchronous belt associated with the second motor is a second synchronous belt, wherein
an extending direction of the first synchronous belt is a first direction, an extending direction of the second synchronous belt is a second direction, and the first direction and the second direction intersect; and
an axial direction of a rotating shaft of the first synchronous wheel is perpendicular to the first direction, an axial direction of a rotating shaft of the second synchronous wheel is perpendicular to the second direction, and the axial direction of the rotating shaft of the first synchronous wheel is different from the axial direction of the rotating shaft of the second synchronous wheel.

3. The slip simulation apparatus according to claim 2, wherein
there are at least two first synchronous belts, the at least two first synchronous belts are parallel to each other, and the at least two first synchronous belts are separated by a limit strip on the first synchronous wheel; and
there are at least two second synchronous belts, the at least two second synchronous belts are parallel to each other, and the at least two second synchronous belts are separated by a limit strip on the second synchronous wheel.

4. The slip simulation apparatus according to claim 2, wherein the first direction is perpendicular to the second direction, and the first synchronous belt and the second synchronous belt have an overlapping portion in a target direction, wherein
the target direction is a direction perpendicular to a plane formed by the first direction and the second direction.

5. The slip simulation apparatus according to claim 2, wherein the base comprises a base plate, two transverse detachable side plates, and two longitudinal detachable side plates, wherein
the two transverse detachable side plate are arranged in parallel and opposite each other, and are both fixedly connected to the base plate, the first synchronous wheel is rotatably arranged on the base plate and between the transverse detachable side plates, and the first motor is fixedly connected to the base plate; and the two longitudinal detachable side plate are arranged in parallel and opposite each other, and are both fixedly connected to the base plate, the second synchronous wheel is rotatably arranged on the base plate and between the longitudinal detachable side plates, and the second motor is fixedly connected to the base plate.

6. The slip simulation apparatus according to claim 2, wherein
an outer surface of the first synchronous belt is provided with a concave-convex texture different from that of the second synchronous belt; and
inner surfaces of the first synchronous belt and the second synchronous belt are both made of smooth rubber.

7. The slip simulation apparatus according to claim 1, wherein the apparatus further comprises:
a control end communicator, communicably connected to the slip simulation controller, and configured to receive slip data from a controlled end communicator,
the slip simulation controller being further configured to:
receive the slip data from the control end communicator, and generate, based on the slip data, the rotating speed control signal used for controlling the at least one motor, to control a rotating speed of the at least one motor.

8. The slip simulation apparatus according to claim 7, further comprising:
a control end pressure sensor, communicably connected to the slip simulation controller, and configured to: sense a pressure applied to the at least one synchronous belt, and generate a pressure detection signal, wherein
the slip simulation controller is further configured to: receive the pressure detection signal from the control end pressure sensor, and convert the pressure detection signal into pressure control data; and
the control end communicator is further configured to: receive the pressure control data from the slip simulation controller, and transmit the pressure control data to the controlled end communicator.

9. The slip simulation apparatus according to claim 1, wherein
the slip simulation controller comprises a proportional-integral-derivative (PID) controller; and
for each motor, the PID controller generates a voltage control signal according to rotating speed data of the motor and the rotating speed control signal, and adjusts, according to the voltage control signal, a voltage applied to the motor, to adjust a rotating speed of the motor.

10. A controlled robot, comprising:
a slip simulation apparatus, comprising: a base; at least one motor arranged on the base; a slip simulation controller, configured to receive slip data and generate a rotating speed control signal used for controlling the at least one motor; and at least one synchronous wheel, at least one synchronous belt, and at least one limit apparatus associated with the motor,
the synchronous belt being sleeved on the synchronous wheel and the limit apparatus, the motor being drivingly connected to the at least one synchronous wheel to drive, according to the rotating speed control signal, the at least one synchronous wheel and the at least one synchronous belt to rotate,
wherein an end of a rotating shaft of a synchronous wheel of the at least one synchronous wheel is sleeved with a tension slider, the tension slider is embedded in a tension sliding groove inside the base, and a position of the tension slider in the tension sliding groove is limited by using a mechanism embedded on the tension sliding groove;
a controlled end communicator, configured to: receive pressure control data from the slip simulation apparatus, and transmit the slip data to the slip simulation apparatus;
a controlled end pressure sensor, configured to: detect a pressure applied by the controlled robot, and generate pressure data of the controlled robot based on the detected pressure; and
a controlled end controller, communicably connected to the controlled end communicator and the controlled end pressure sensor;
the controlled end controller being configured to:
adjust, according to the pressure data of the controlled robot from the controlled end pressure sensor and the pressure control data from the controlled end communicator, the pressure applied by the controlled robot; and
convert the pressure data of the controlled robot into the slip data, and transmit the slip data to the controlled end communicator.

11. The controlled robot according to claim 10, further comprising a robot finger, wherein the robot finger comprises a finger motor, a mechanical transmission portion, and a finger clamping portion, wherein
the finger motor is configured to drive the robot finger; the controlled end controller is configured to control a clamping force of the robot finger;
the controlled end controller is further configured to generate, according to the pressure data of the controlled robot and the pressure control data, a rotating speed control signal used for controlling the finger motor, and
the finger motor is further configured to drive the mechanical transmission portion, and the mechanical transmission portion drives the finger clamping portion, and adjusts a clamping force of the finger clamping portion.

12. The controlled robot according to claim 10, wherein the at least one motor comprises a first motor and a second motor, wherein
the synchronous wheel associated with the first motor is a first synchronous wheel, and the synchronous belt associated with the first motor is a first synchronous belt; and
the synchronous wheel associated with the second motor is a second synchronous wheel, and the synchronous belt associated with the second motor is a second synchronous belt, wherein
an extending direction of the first synchronous belt is a first direction, an extending direction of the second synchronous belt is a second direction, and the first direction and the second direction intersect; and
an axial direction of a rotating shaft of the first synchronous wheel is perpendicular to the first direction, an axial direction of a rotating shaft of the second synchronous wheel is perpendicular to the second direction, and the axial direction of the rotating shaft of the first synchronous wheel is different from the axial direction of the rotating shaft of the second synchronous wheel.

13. The controlled robot according to claim 12, wherein there are at least two first synchronous belts, the at least two first synchronous belts are parallel to each other, and the at least two first synchronous belts are separated by a limit strip on the first synchronous wheel; and there are at least two second synchronous belts, the at least two second synchronous belts are parallel to each other, and the at least two second synchronous belts are separated by a limit strip on the second synchronous wheel.

14. The controlled robot according to claim 12, wherein the first direction is perpendicular to the second direction, and the first synchronous belt and the second synchronous belt have an overlapping portion in a target direction, wherein the target direction is a direction perpendicular to a plane formed by the first direction and the second direction.

15. The controlled robot according to claim 14, wherein the slip simulation apparatus further comprising:

a control end pressure sensor, communicably connected to the slip simulation controller, and configured to: sense a pressure applied to the at least one synchronous belt, and generate a pressure detection signal, wherein the slip simulation controller is further configured to: receive the pressure detection signal from the control end pressure sensor, and convert the pressure detection signal into pressure control data; and the control end communicator is further configured to: receive the pressure control data from the slip simulation controller, and transmit the pressure control data to the controlled end communicator.

16. The controlled robot according to claim 10, wherein the slip simulation apparatus further comprises:

a control end communicator, communicably connected to the slip simulation controller, and configured to receive slip data from a controlled end communicator, the slip simulation controller being further configured to: receive the slip data from the control end communicator, and generate, based on the slip data, the rotating speed control signal used for controlling the at least one motor, to control a rotating speed of the at least one motor.

17. The controlled robot according to claim 10, wherein the slip simulation controller comprises a proportional-integral-derivative (PID) controller; and for each motor, the PID controller generates a voltage control signal according to rotating speed data of the motor and the rotating speed control signal, and adjusts, according to the voltage control signal, a voltage applied to the motor, to adjust a rotating speed of the motor.

18. The controlled robot according to claim 10, wherein two ends of a rotating shaft of the synchronous wheel are sleeved with at least one tension slider, and the tension slider is embedded in a tension sliding groove inside the base, wherein a position of the tension slider in the tension sliding groove is limited by using a limit jackscrew embedded on the tension sliding groove.

19. A game handle, comprising:

a housing;

a power supply; and a slip simulation apparatus arranged inside the housing, the slip simulation apparatus comprising: a base; at least one motor arranged on the base; a slip simulation controller, configured to receive slip data and generate a rotating speed control signal used for controlling the at least one motor; and at least one synchronous wheel, at least one synchronous belt, and at least one limit apparatus associated with the motor, the synchronous belt being sleeved on the synchronous wheel and the limit apparatus, the motor being drivingly connected to the at least one synchronous wheel to drive, according to the rotating speed control signal, the at least one synchronous wheel and the at least one synchronous belt to rotate, wherein an end of a rotating shaft of a synchronous wheel of the at least one synchronous wheel is sleeved with a tension slider, the tension slider is embedded in a tension sliding groove inside the base, and a position of the tension slider in the tension sliding groove is limited by using a mechanism embedded on the tension sliding groove;

the slip simulation apparatus being configured to: receive the slip data from a virtual game console, and output pressure control data to the virtual game console, to control a virtual object in a virtual game application, the virtual game application being run in the virtual game console.

* * * * *